US010622821B2

United States Patent
Chen et al.

(10) Patent No.: US 10,622,821 B2
(45) Date of Patent: Apr. 14, 2020

(54) CHARGING APPARATUS OF MOBILE TERMINAL

(71) Applicant: Guangdong Oppo Mobile Telecommunications Corp., Ltd., Dongguan, Guangdong (CN)

(72) Inventors: Shebiao Chen, Guangdong (CN); Jun Zhang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 529 days.

(21) Appl. No.: 15/402,864

(22) Filed: Jan. 10, 2017

(65) Prior Publication Data
US 2017/0155263 A1   Jun. 1, 2017

Related U.S. Application Data

(63) Continuation-in-part of application No. PCT/CN2015/095628, filed on Nov. 26, 2015.

(51) Int. Cl.
*H02J 7/00* (2006.01)
*H02J 7/04* (2006.01)

(52) U.S. Cl.
CPC ...... *H02J 7/0044* (2013.01); *H02J 7/007192* (2020.01); *H02J 7/045* (2013.01);
(Continued)

(58) Field of Classification Search
CPC .. H02J 2007/0062; H02J 7/044; H02J 7/0052; H02J 7/047
(Continued)

(56) References Cited

U.S. PATENT DOCUMENTS

| 7,012,405 B2 * | 3/2006 | Nishida | H02J 7/0073 320/137 |
| 7,592,780 B2 * | 9/2009 | Funabashi | H02J 7/022 320/150 |

(Continued)

FOREIGN PATENT DOCUMENTS

| CN | 1667911 A | 9/2005 |
| CN | 103762691 A | 4/2014 |

(Continued)

OTHER PUBLICATIONS

Extended European search report issued in corresponding European application No. 15897378.4 dated Mar. 15, 2018.
(Continued)

*Primary Examiner* — Drew A Dunn
*Assistant Examiner* — Tessema Kebede
(74) *Attorney, Agent, or Firm* — Young Basile Hanlon & MacFarlane, P.C.

(57) ABSTRACT

A charging apparatus for a mobile terminal includes: a control chip connected with the USB interface; a current detection circuit connected with the power supply circuit; a voltage detection circuit connected with the power supply circuit; an analog to digital converter (ADC) connected with the current detection circuit, the voltage detection circuit, and the control chip respectively, the current detection circuit and the voltage detection circuit are configured to provide the control chip with the current value of the current output current and the voltage value of the current output voltage respectively through the ADC; a power adjusting circuit connected with the control chip and the power supply circuit respectively, configured to adjust an output power of the power supply circuit based on the control of the control chip.

16 Claims, 5 Drawing Sheets

(52) U.S. Cl.
CPC .............. *H02J 7/00* (2013.01); *H02J 7/0013* (2013.01); *H02J 7/0052* (2013.01); *H02J 2007/0062* (2013.01)

(58) Field of Classification Search
USPC ........................................................ 320/114
See application file for complete search history.

(56) References Cited

U.S. PATENT DOCUMENTS

| | | | |
|---|---|---|---|
| 10,050,466 B2* | 8/2018 | Hu ........................... | H02J 7/022 |
| 10,193,368 B2* | 1/2019 | Zhang ..................... | H02J 7/045 |
| 2006/0076921 A1* | 4/2006 | Kubota ................. | H02J 7/0072 |
| | | | 320/107 |
| 2008/0231236 A1* | 9/2008 | Watanabe ............. | H02J 7/0006 |
| | | | 320/150 |
| 2010/0090647 A1 | 4/2010 | Umetsu et al. | |
| 2010/0127666 A1 | 5/2010 | Ball | |
| 2011/0095722 A1* | 4/2011 | Chang ................... | H02J 7/0055 |
| | | | 320/107 |
| 2012/0246350 A1* | 9/2012 | Lee ....................... | H02J 7/0008 |
| | | | 710/16 |
| 2012/0286724 A1* | 11/2012 | Tsai ........................ | H02J 7/025 |
| | | | 320/108 |
| 2014/0313792 A1 | 10/2014 | Nate et al. | |
| 2016/0190848 A1* | 6/2016 | Chen ..................... | H02J 7/0052 |
| | | | 320/162 |
| 2016/0241016 A1* | 8/2016 | Rana ..................... | H02H 3/006 |
| 2017/0040804 A1* | 2/2017 | Hu .......................... | H02J 7/022 |

FOREIGN PATENT DOCUMENTS

| | | |
|---|---|---|
| CN | 103762702 A | 4/2014 |
| CN | 103795040 A | 5/2014 |
| CN | 104810873 A | 7/2015 |
| CN | 104810877 A | 7/2015 |
| CN | 104993562 A | 10/2015 |
| CN | 106549441 A | 3/2017 |
| CN | 107482697 A | 12/2017 |
| CN | 207008016 U | 2/2018 |
| EP | 3101752 A1 | 12/2016 |
| EP | 3101758 A1 | 12/2016 |
| JP | 2002238173 A | 8/2002 |
| TW | I424168 B | 1/2014 |
| TW | I455391 B | 10/2014 |

OTHER PUBLICATIONS

Office Action 1 issued in corresponding EP application No. 15897378.4 dated Feb. 18, 2019.
Anonymous, High-Speed USB 2.0 DPST Switch with overvoltage protection (ovp) and dedicated charger port protection, Sep. 5, 2013, pp. 1-18.

* cited by examiner

CHARGING APPARATUS OF MOBILE TERMINAL

CROSS-REFERENCE TO RELATED APPLICATION(S)

This application is a continuation of International Application No. PCT/CN2015/095628, filed on Nov. 26, 2015, the disclosure of which is herein incorporated by reference in its entirety.

TECHNICAL FIELD

The present disclosure relates to the field of charging, and particularly to a charging apparatus of a mobile terminal.

BACKGROUND

With rapid development of mobile terminals (such as mobile phones, tablets), the battery power issue of the mobile terminal has become the concern of users and mobile terminal manufacturers.

Conventional charging apparatus for the mobile terminal typically include adapters, Mobile power, and the like. Take the adapter as an example, the adapter usually takes alternating current (AC) from the electricity, and then through AC conversion, rectification and other operations, the alternating current can be converted into direct current (DC) suitable for charging of the mobile terminal. For example, the adapter usually converts 220V AC to 5V DC as the charging voltage of the mobile terminal.

However, with the requirements on charging speed and charging safety gradually increased, it is increasingly difficult for the charging apparatus with simple function to meet the charging needs of the mobile terminal.

SUMMARY

Disclosed herein are implementations of an apparatus for charging of a mobile terminal, comprising an input end, configured to receive an alternating current, a Universal Serial Bus (USB) interface, configured to connect the charging apparatus with the mobile terminal, a power supply circuit connected with the input end and the USB interface respectively, wherein the power supply circuit is configured to convert the alternating current inputted through the input end into a direct current and transmit an output power of the power supply circuit to the mobile terminal through the USB interface, so as to charge a battery of the mobile terminal, wherein the charging apparatus further comprises a control chip connected with the USB interface, wherein the control chip is configured to exchange data with the mobile terminal through a data line of the USB interface, a current detection circuit connected with the power supply circuit and configured to detect a current output current of the power supply circuit, a voltage detection circuit connected with the power supply circuit and configured to detect a current output voltage of the power supply circuit, an analog to digital converter (ADC) connected with the current detection circuit, the voltage detection circuit, and the control chip, respectively, wherein the current detection circuit and the voltage detection circuit are configured to provide the control chip with the a current value of the current output current and the a voltage value of the current output voltage respectively through the ADC, respectively, and a power adjusting circuit connected with the control chip and the power supply circuit respectively and, configured to adjust an output power of the power supply circuit based on the control of the control chip.

Disclosed herein are also implementations of an apparatus for charging of a mobile terminal, comprising an input end, configured to receive an alternating current, a power supply circuit connected with the input end, a control chip configured to exchange data with the mobile terminal, a current detection circuit connected with the power supply circuit and configured to detect a output current of the power supply circuit, a voltage detection circuit connected with the power supply circuit and configured to detect a output voltage of the power supply circuit, an analog to digital converter (ADC) connected with the current detection circuit, the voltage detection circuit, and the control chip, respectively, and a power adjusting circuit connected with the control chip and the power supply circuit respectively and configured to adjust an output power of the power supply circuit based on the control of the control chip.

BRIEF DESCRIPTION OF THE DRAWINGS

In order to illustrate the technical solutions of the present disclosure or the related art more clearly, a brief description of the accompanying drawings used herein is given below. Obviously, the drawings listed below are only examples, and a person skilled in the art should be noted that, other drawings can also be obtained on the basis of these exemplary drawings without creative work.

DETAILED DESCRIPTION

Technical schemes of the implementations of the present disclosure will be described clearly and completely with reference to the accompanying drawings. The implementations described below are merely part of the present disclosure, and a person skilled in the art should be noted that, other implementations obtained on the basis of these exemplary implementations without creative work should fall into the protective scope of the present disclosure.

Implementations of the present disclosure will be described in detail below with reference to the accompanying drawings. Throughout the specification, identical or similar elements are denoted by the same reference numerals.

Implementation 1

Figure 1:
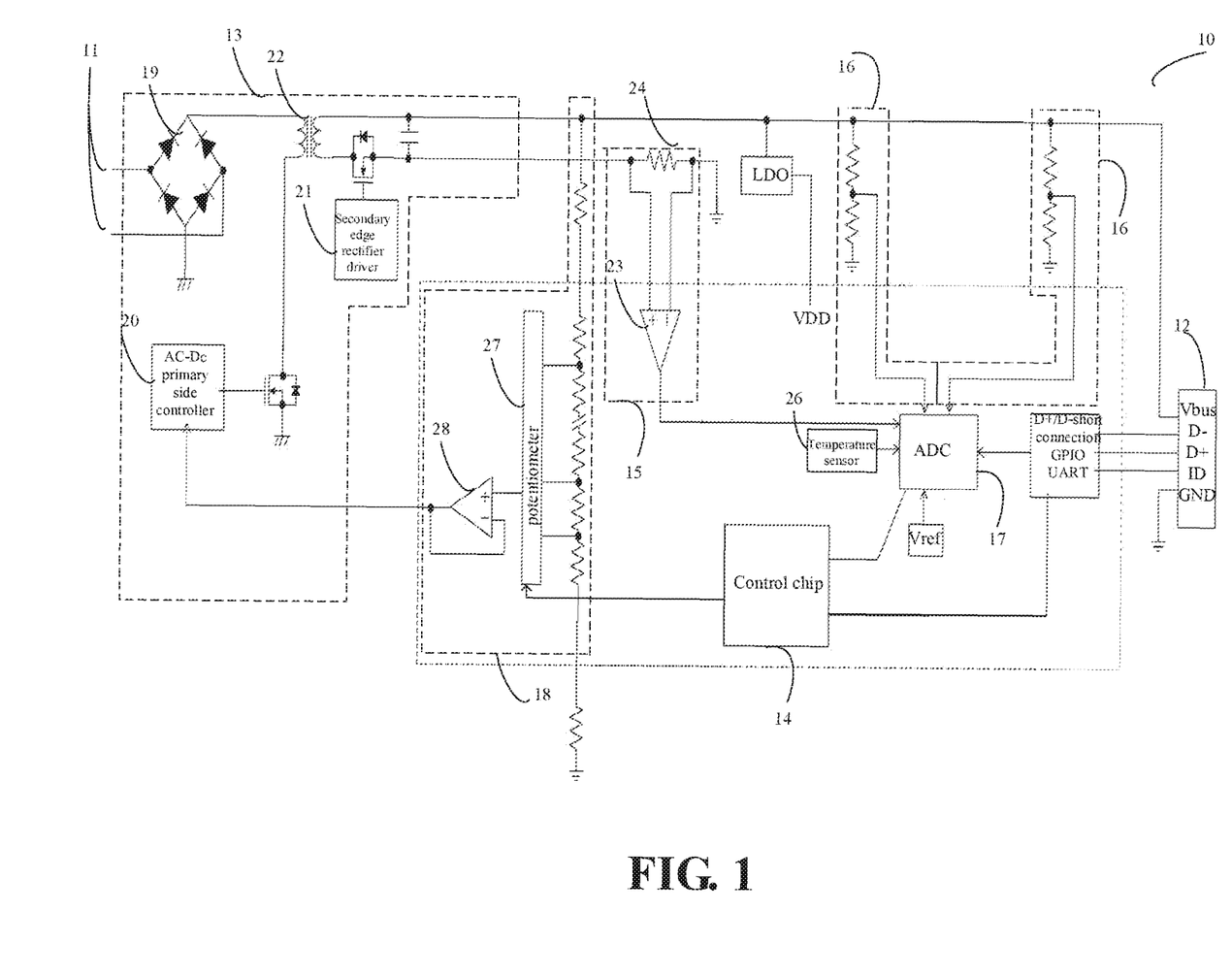
FIG. 1 is a schematic structure diagram illustrating a charging apparatus of a mobile terminal according to an implementation of the present disclosure.

FIG. 1 is a schematic structure diagram illustrating a charging apparatus of a mobile terminal according to an implementation of the present disclosure. FIG. 1 illustrates a charging apparatus 10, which includes: an input end 11, configured to receive an alternating current; an interface 12, if any, such as a Universal Serial Bus (USB) interface or other data transmission/communication interface that can achieve the connection and/or interaction between the charging apparatus and the terminal, configured to connect the charging apparatus 10 with the mobile terminal; a power supply circuit 13 connected with the input end 11 and the USB interface 12 respectively, and the power supply circuit 13 can convert the alternating current inputted through the input end 11 into a direct current and transmit an output power of the power supply circuit 13 to the mobile terminal through the USB interface 12, so as to charge a battery of the mobile terminal.

The charging apparatus 10 further includes: a control chip 14 connected with the USB interface 12 and can exchange data with the mobile terminal through a data line of the USB interface 12; a current detection circuit 15 connected with the power supply circuit 13 and configured to detect a current output current of the power supply circuit 13; a voltage detection circuit 16 connected with the power supply circuit 13 and configured to detect a current output voltage of the power supply circuit 13; an analog to digital converter (ADC) 17 connected with the current detection circuit 15, the voltage detection circuit 16, and the control chip 14 respectively, and the current detection circuit 15 and the voltage detection circuit 16 are configured to provide the control chip 14 with the current value of the current output current and the voltage value of the current output voltage respectively through the ADC 17; a power adjusting circuit 18 connected with the control chip 14 and the power supply circuit 13 respectively and adjust an output power of the power supply circuit 13 based on the control of the control chip 14.

In the charging apparatus of a mobile terminal according to the present disclosure, the control chip is provided in the charging apparatus, data can be exchanged with the mobile terminal through the control chip, and the current detection circuit, the voltage detection circuit, the ADC, the power adjusting circuit as well as other circuits are provided around the control chip, which can improve the intelligent level of the mobile terminal and provide a hardware foundation for quick charging, safe charging and so on.

For example, the mobile terminal can be a mobile phone in one implementation and can be a Pad in another implementation.

USB interface

According to an implementation, the USB interface 12 can be a normal USB interface or a Micro USB interface. Generally, the USB interface can include 5 pins, for example, the USB interface can include a D+ data line, a D− data line, an ID line, a V-Bus, and an earth wire; however, the present disclosure is not limited thereto, for example, the USB interface can be a USB interface designed specifically for quick charging, such as a USB interface including 7 pins, among which the new pins can be used with the original charging lines together to carry a greater charging current.

Power Supply Circuit

The form of the power supply circuit 13 is not restricted in the present disclosure, for example, the power supply circuit 13 can adopt a transformer 22 as illustrated in FIG. 1. The transformer 22 has a primary side connected with a rectifier bridge 19 and an AC-DC primary side controller 20 which can adjust the voltage of the primary side. The transformer 22 has a secondary side connected with a rectifier driver 21, and can transmit the rectified output current to a V-Bus of the USB interface 12.

Control Chip

The type of the control chip 14 can be selected according to actual needs, for example, it can be selected according to the actual function to be achieved or the interface type to be provided or other options. In an implementation, the control chip 14 can have its own read-only memory(ROM) and/or Random Access Memory (RAM), for example, the control chip 14 can include a 16 KB ROM and a 1 KB RAM. In an example, the control chip 14 can be a MCU.

The control chip 14 can exchange data with the mobile terminal through a data line(s) of the USB interface 12. Alternatively, the control chip 14 can communicate with the mobile terminal through the data line of the USB interface 12. For example, through the data line in the USB interface 12, the control chip 14 can conduct two-way communication with the mobile terminal, exchange handshake information, and so on. By communication, the control chip 14 and the mobile terminal can negotiate the charging mode together, or if one party has a security risk, the other party can be notified immediately, which can improve the intelligent level of the mobile terminal and provide a hardware foundation for quick charging, safe charging, and so on.

The manner in which the control chip 14 interacts with the mobile terminal through the data line of the USB interface 12 can be various, for example, the control chip 14 can provide clock signals through the D+ data line of the USB interface 12, or the control chip 14 can transmit data through the D− data line of the USB interface 12.

Current Detection Circuit

It should be understood that, the manner in which the current detection circuit 15 detects the current output current of the power supply circuit 13 can be various. Optionally, in an implementation, as illustrated in FIG. 1, the current detection circuit 15 can include a second operational amplifier 23. The second operational amplifier 23 has two input ends connected in parallel at both ends of a current sense resistor 24 of the power supply circuit 13. The second operational amplifier 23 has an output end connected with the ADC 17. The second operational amplifier 23 can detect an output current of the power supply circuit 13 through a voltage drop across both ends of the current sense resistor 24.

Voltage Detection Circuit

It should be understood that, the manner in which the voltage detection circuit 16 detects the current output voltage of the power supply circuit 13 can be various. Optionally, in an implementation, as illustrated in FIG. 1, the voltage detection circuit 16 detects the current output voltage of the power supply circuit 13 in a way of using two resistors for voltage dividing. The present disclosure has not restriction with regard to the position and number of the voltage detection circuit 16. As illustrated in FIG. 1, the voltage detection circuit 16 can include a first voltage detection circuit 16 and a second voltage detection circuit 16. The first voltage detection circuit 16 and the second voltage detection circuit 16 are provided at both ends of a switching circuit 25 respectively. In practice, it is possible to select at least one voltage detection circuit from the two voltage detection circuits to detect the voltage of the power supply circuit 13 according to the actual situation, for example, it is possible to select based on detection accuracy.

ADC

With regard to the type of the ADC 17 (ADC illustrated in FIG. 1), the present disclosure has no restriction, as long as the analog signal detected by the current detection circuit 15 and the voltage detection circuit 16 can be converted into a digital signal. In addition, the ADC 17 can be connected with a temperature sensor 26 for measuring the temperature in the vicinity of the control chip 14 and transmit the measured temperature to the control chip 14. The control chip 14 can control the ON/OFF of the power supply circuit 13 according to the temperature in the vicinity thereof; for example, if the temperature is greater than a preset temperature threshold, the power supply circuit 13 will be turned off. In an implementation, a reference voltage (for example, Vref as illustrated in FIG. 1) can be provided to the ADC 17 for reference in the digital-to-analog signal conversion of the ADC 17.

Optionally, in an implementation, the ADC 17 can connect with a pin of the data line of the USB interface 12 so as to obtain a voltage value of the data line pin and transmit the voltage value to the control chip 14. The control chip 14 can adjust an output power of the power supply circuit 13 through the power adjusting circuit 18 according to the voltage value of the data line pin.

In other words, the analog to digital conversion (ADC) multiplexing function can be added to D+/D− pins, such that the control chip 14 can detect the voltage of the D+/D− pins, and more functionality and control logic can be achieved based on the voltage value of the D+/D− pins.

Power Adjusting Circuit

The form of the power adjusting circuit 18 can vary. For example, refer to FIG. 1, the power adjusting circuit 18 can include a potentiometer 27, and the potentiometer 27 can be a digital potentiometer. The output voltage of the power supply circuit 13 can be adjusted by sliding the potentiometer 27. In addition, the power adjusting circuit 18 can also include a first operational amplifier 28. Via the first operational amplifier 28, the power adjusting circuit 18 can be connected to a controller 20 (AC-DC primary side controller) on a primary side of the transformer 22, and control the output current of the power supply circuit 13 through the controller 20.

In the implementation of the present disclosure, the number of circuit devices is relatively large, and the structure and function thereof are relatively complicated. In order to make the circuit structure more simple as well as reduce costs, optionally, in an implementation, the control chip 14, the current detection circuit 15, the ADC 17, the voltage detection circuit 16, and the power adjusting circuit 18 can be integrated in an integrated circuit.

Implementation 2

Figure 2:
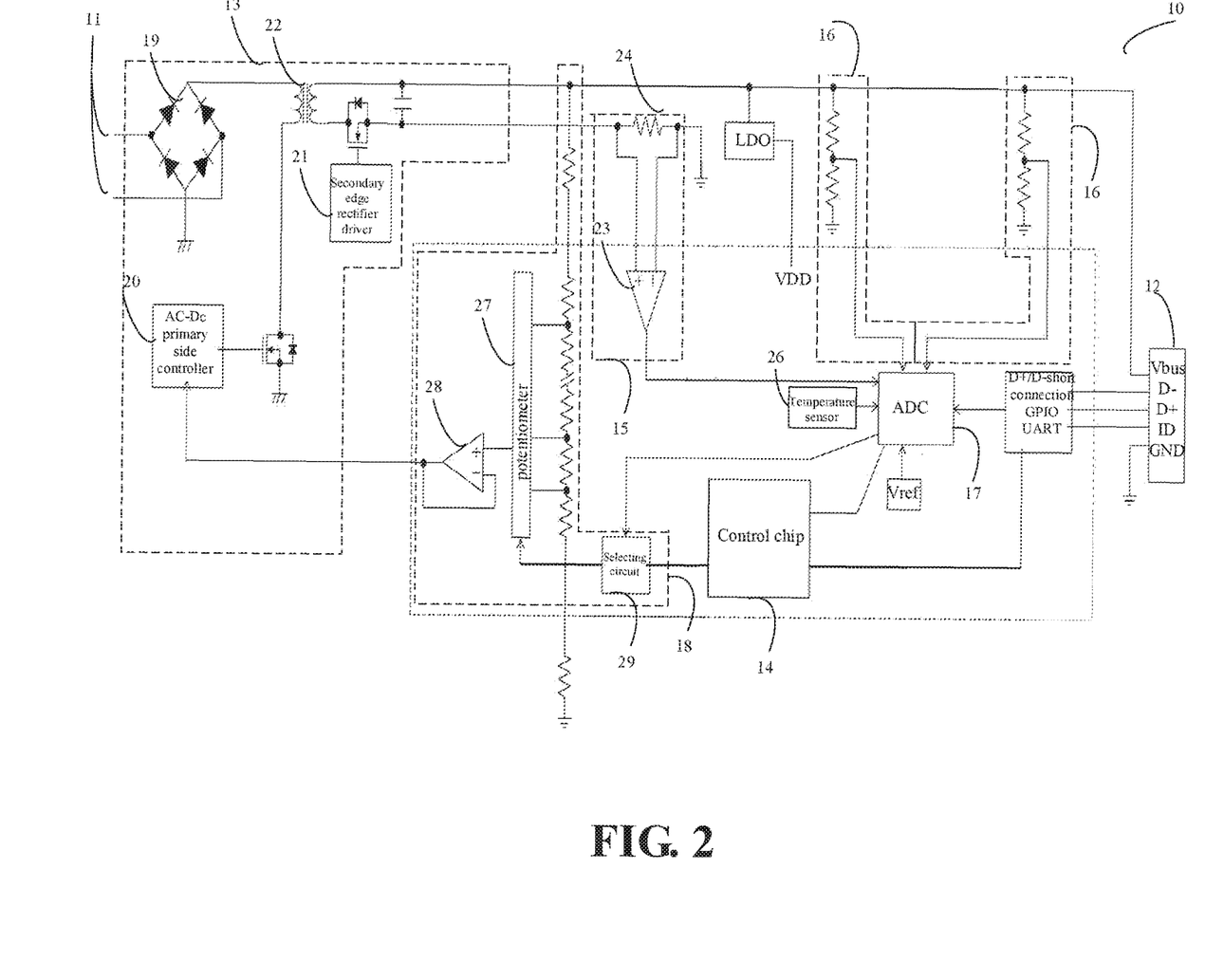
FIG. 2 is a schematic structure diagram illustrating a charging apparatus of a mobile terminal according to another implementation of the present disclosure.
Figure 5:
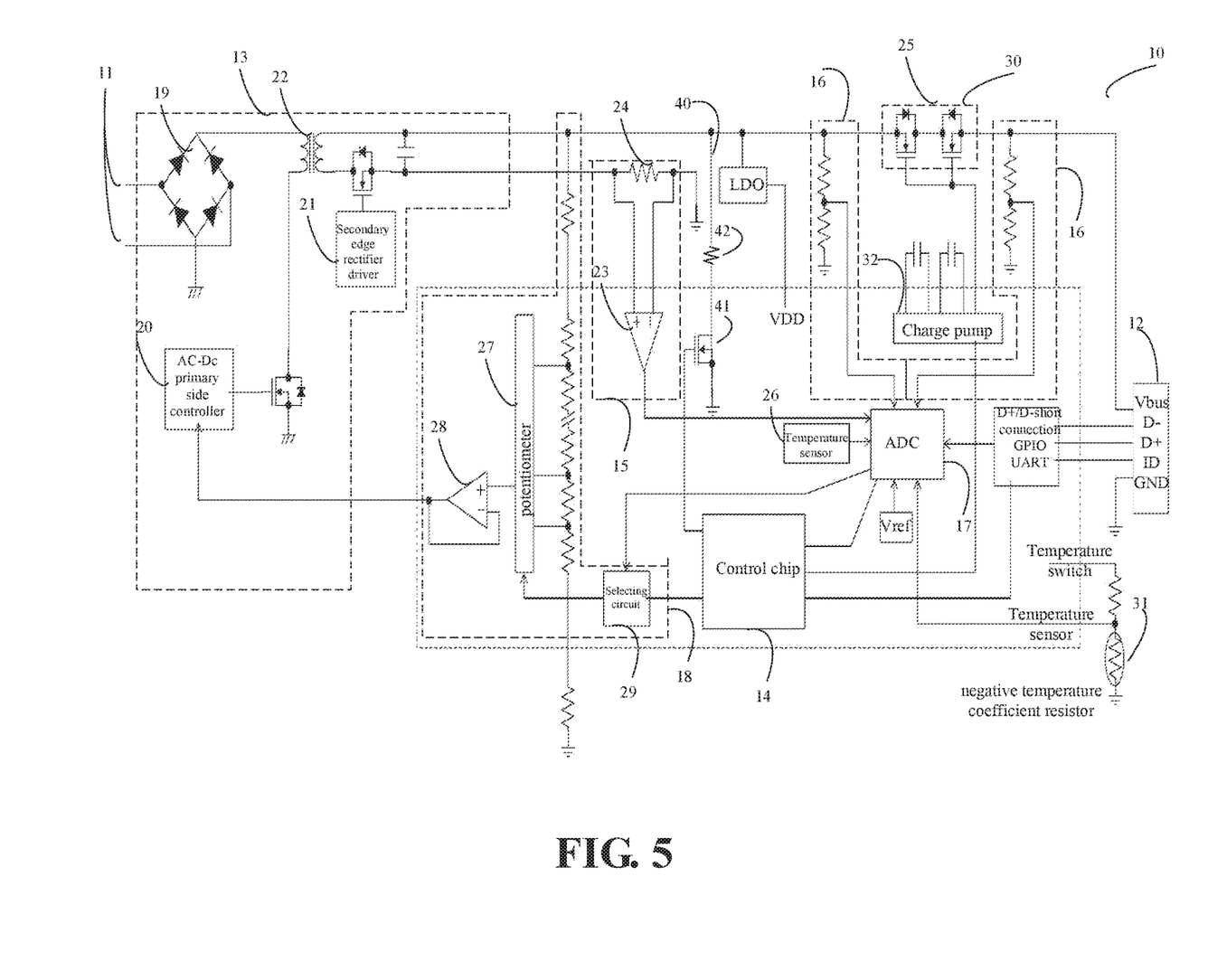
FIG. 5 is a schematic structure diagram illustrating a charging apparatus of a mobile terminal according to another implementation of the present disclosure.

Optionally, combining the structure described according to implementation 1, in an implementation, as shown in FIG. 2 or FIG. 5, the charging apparatus 10 can further include: a selecting circuit 29, which has a first input end that can be connected with the control chip 14, a second input end that can be connected with the ADC 17 directly without passing through the control chip 14, and an output end that can be connected with the power adjusting circuit 18; the selecting circuit 29 can select one current control signal from a current control signal input through the first input end and a current control signal input through the second input end, and adjust an output current of the power supply circuit 13 through the power adjusting circuit 18 based on the current control signal selected.

In this implementation, the current detection circuit 15, the ADC 17, and the selecting circuit 29 are hardware circuits capable of realizing current adjustment. The hardware circuits can reduce the load on the control chip 14 and improve the processing efficiency of the charging apparatus 10 without the involvement of the control chip 14. Alternatively, the control chip 14 can control the output current of the power supply circuit 13 through the selecting circuit 29. When implemented, the selecting circuit 29 can select one of the two current control signals to control the output current of the power supply circuit 13. For example, the selecting circuit 29 can be a switching circuit, which can determine whether the current is controlled by the hardware circuit or the control chip 14 according to actual needs. Alternatively, the selecting circuit 29 can include a comparator, with which a smaller value can be selected from current values indicated by current control signals of the hardware circuit and the control chip 14, and the control chip 14 can control the current of the power supply circuit 13 based on the smaller value.

Implementation 3

Figure 3:
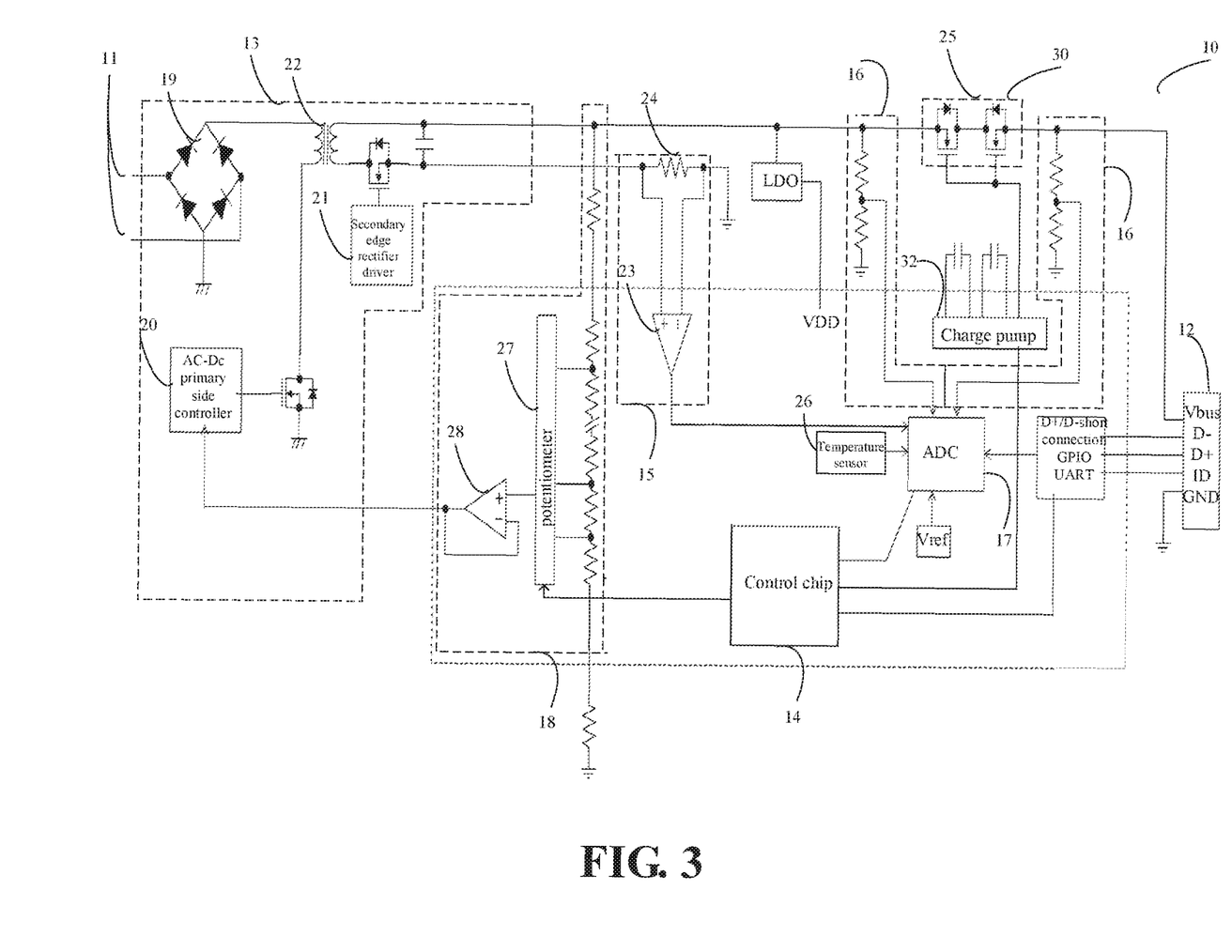
FIG. 3 is a schematic structure diagram illustrating a charging apparatus of a mobile terminal according to another implementation of the present disclosure.

Optionally, combining the structure described according to any of the above implementations, in an implementation, as shown in FIG. 3 or FIG. 5, the charging apparatus 10 can further include: a switching circuit 25 connected in series in the power supply circuit 13 and connected with the control chip 14; the control chip 14 is further configured to control the ON/OFF of a charging circuit between the charging apparatus 10 and the mobile terminal through the switching circuit 25.

The switching circuit 25 can ensure a timely turn-off of the circuit in the event of a failure and therefore can improve the safety of the charging apparatus 10. The switching circuit 25 can be in a variety of forms. Optionally, according to an implementation, the switching circuit 25 can include: a switch transistor assembly 30 (or can be referred to as "switch assembly") connected in series in the power supply circuit 13; a charge pump 32, which has one end connected with a control end of the switch transistor assembly 30 and another end connected with the control chip 14; the control chip 14 can generate a target control voltage through the charge pump 32 and control the switch transistor assembly 30 to turn on, among which the target control voltage is greater than a working voltage (VDD) of the charging apparatus 10.

With aid of the charge pump 32, the voltage of the switch transistor control end can be enhanced, for example, can be enhanced to 3 times of VDD (drain-to-drain voltage), so as to achieve a sufficiently high voltage that the switch transistor assembly 30 can be fully turned on.

The switch transistor assembly 30 can be in a variety of forms. For example, the switch transistor assembly 30 can include one switch transistor or more than one switch transistor. Optionally, refer to FIG. 3, the switch transistor assembly 30 can include a first switch transistor and a second switch transistor, which are connected in series in the power supply circuit 13 and disposed back to back. By disposing two switch transistors back-to-back, reverse leakage generated by parasitic diodes of the switch transistors can be avoided. "Switch transistor" used herein can be a MOS transistor or other transistors.

Implementation 4

Optionally, combining the structure described according to any of the above implementations, in an implementation, as shown in FIG. 5, the charging apparatus 10 can further include a temperature detection circuit 31, which can connect with the ADC 17 and transmit a detected temperature to the control chip 14 through the ADC 17. In a case that the switching circuit 25 is provided in the charging apparatus 10, the control chip 14 can control the ON/OFF of the switching circuit 25 according to the temperature detected by the temperature detection circuit 31.

The present disclosure has no restriction on the location of the temperature detection circuit 31. For example, since the USB interface 12 is often overheated, the temperature detection circuit 31 can be provided to the vicinity of the USB interface 12. The switching circuit 25 can be controlled to turn off through the control chip 14 if the temperature of the USB interface 12 is greater than or equal to a preset temperature threshold, so as to ensure the safety of the charging apparatus.

The present disclosure has no restriction on the form of the temperature detection circuit 31. For example, refer to FIG. 5, the temperature detection circuit 31 can include: a temperature sensor connected with the ADC 17; a negative temperature coefficient resistor, which has one end connected with the temperature sensor and other end grounded. Without a doubt, the temperature detection circuit 31 can be an external temperature switch that can connect to the control chip 14 directly. The control chip 14 can to determine whether or not the temperature detection function is enabled.

Implementation 5

Figure 4:
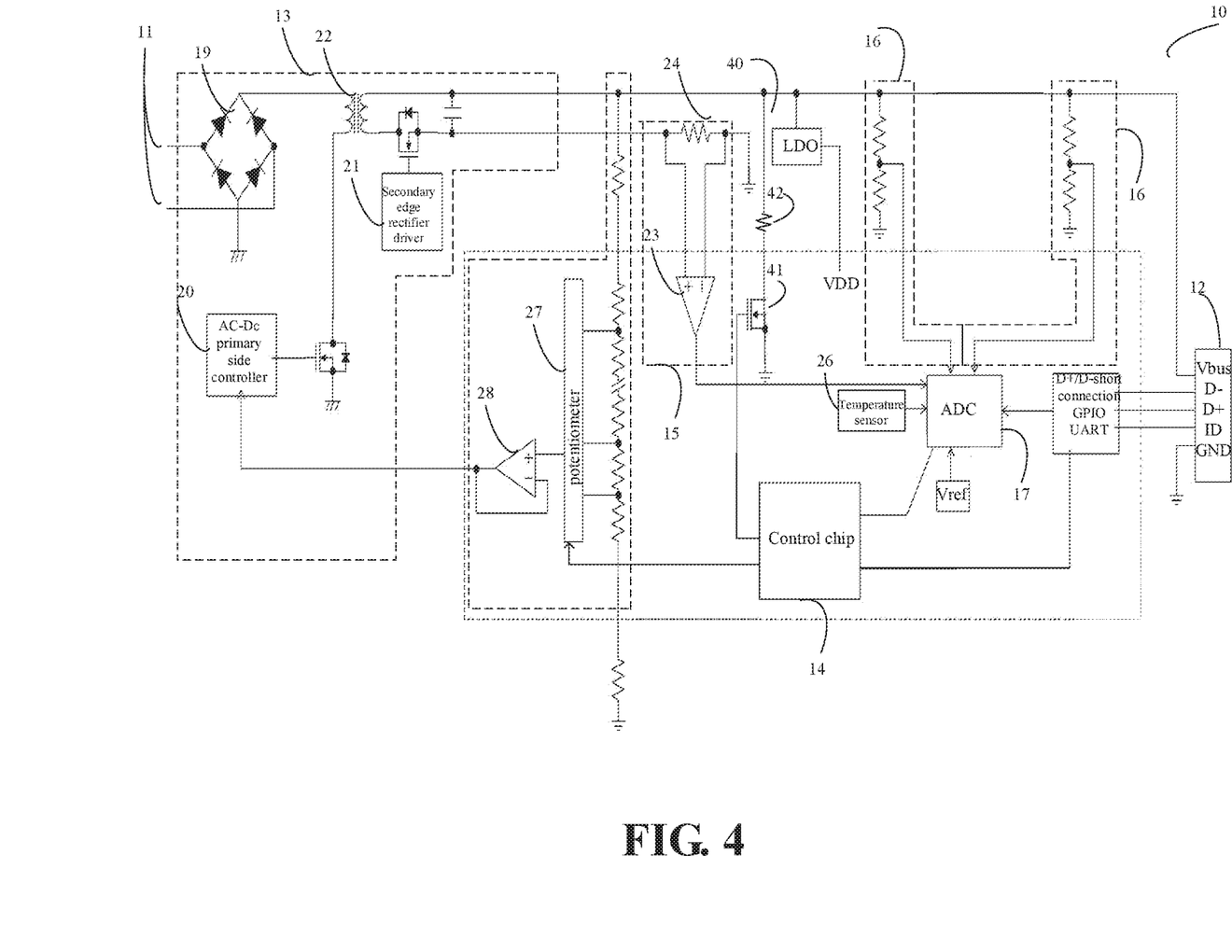
FIG. 4 is a schematic structure diagram illustrating a charging apparatus of a mobile terminal according to another implementation of the present disclosure.

Optionally, combining the structure described according to any of the above implementations, in an implementation, as shown in FIG. 4 or FIG. 5, the charging apparatus 10 can further include: a load circuit 40 connected with the power supply circuit 13 and the control chip 14 respectively; the control chip 14 is further configured to control the load circuit 40 to turn on if the output voltage of the power supply circuit 13 is less than a preset voltage threshold, and supply power for load devices of the load circuit 40 through the power supply circuit 13, so as to maintain the stability of the power supply circuit 13. As an implementation, the load circuit 40 can include a third switch transistor 41, and a load resistor 42 connected in series in the load circuit 40, one end connected with the third switch transistor 41 and the other end connected with the power supply circuit 13. Alternatively, the load resistor can be connected in series between the third switch transistor 41 and ground. The third switch transistor 41 has a control end connected with the control chip 14, an input end connected with the power supply circuit 13, and an output end grounded.

It should be understood that, through the data line of the USB interface 12, the control chip 14 can perform at least one of the following operations: short connecting a D+ data line and a D− data line of the USB interface 12 for example, when the charging apparatus 10 is connected with the mobile terminal, the control chip 14 can cause the D+ data line and the D− data line of the USB interface 12 to be short connected to provide a normal charging mode; in this way, it can be better compatible with the related art. The control chip 14 can exchange data with the data line of the USB interface 12 via a General Purpose Input/output (GPIO) port, or the control chip 14 can exchange data in the format of Universal Asynchronous Receiver Transmitter (UART) with the mobile terminal. For example, the control chip 14 can perform a handshake with the mobile terminal through the GIPO port, as well as transmit firmware upgrade data for an adapter through a UART port.

Optionally, according to an implementation, the control chip 14 can further connect with an ID line of the USB interface 12; the control chip 14 is further configured to identify, through the ID line, whether a charging data line between the charging apparatus 10 and the mobile terminal is a data line that support quick charging.

For example, a chip or chips can be provided in the charging data line, and signals can be transmitted to the chip of the charging data line through the control chip 14. It is indicated that the data line supports quick charging if a response signal is received; otherwise, it is indicated that the data line is a normal data line and does not support quick charging if no response signal is received.

Implementation 6

Optionally, combining the structure described according to any of the above implementations, in an implementation, as shown in FIG. 1 through FIG. 5, the power supply circuit 13 can include: a transformer 22; an input circuit arranged on a primary side of a coil of the transformer, the input circuit includes a controller 20 configured to control the voltage of the input circuit; an output circuit arranged on a secondary side of the coil of the transformer 22; the power adjusting circuit includes a potentiometer 27 and a first operational amplifier 28, the potentiometer 27 can connect with the control chip 14 and the output circuit respectively, besides, the potentiometer 27 can connect with the controller 20 of the input circuit through the first operational amplifier 28 and adjust an output voltage of the power supply circuit 13 through the controller 20.

It should be understood that, the switch transistor of the implementation can include but not limited to one of the following or any combination thereof: Metal Oxide Semiconductor (MOSFET), Insulated Gate Bipolar Transistor (IGBT), Integrated Gate Commutated Thyristors (IGCT), Silicon Controlled Rectifier (SCR), or other power devices.

Those of ordinary skill in the art will recognize that, the elements and algorithm steps of various examples described in connection with the implementations disclosed herein can be implemented in electronic hardware, or a combination of computer software and electronic hardware. Whether these functions are implemented in hardware or software depends on the specific application and design constraints of a technical solution. For each particular application, the skilled person can use different methods for the implementation of the described functions; however, such implementation should not be considered as a departure from the scope of the present disclosure.

As will be apparent to those skilled in the art, for the convenience and conciseness of description, with regard to the working processes of the system, the device, and the units illustrated above, reference can be made to corresponding processes in the foregoing method implementations and will not be repeated here.

In the implementations of the present disclosure, it will be appreciated that, the system, the device, and the method disclosed can be achieved in other ways. For example, the device implementations described above are merely illustrative; the division of the units is only a logical function division, and the units can be divided into other ways during the actual implementation, for example, multiple units or components can be combined or can be integrated into another system, or some features can be ignored or not implemented. In addition, the coupling or direct coupling or communication connection illustrated or discussed between each other can be an indirect coupling or indirect communication connection via some interface, device, or unit, and it can be in electrical, mechanical or other forms.

The units illustrated as separate components can or cannot be physically separated, and the components displayed as units can or cannot be physical units, that is to say, the units or components can be arranged in one place, or can be distributed over multiple network elements. Some or all of these units can be selected according to actual needs to achieve the purpose of the implementations of the present disclosure.

In addition, the functional units in various implementations of the present disclosure can be integrated in one processing unit. It is also possible that the individual units are physically present individually, or, it is also possible to integrate two or more units into one unit.

When implemented in the form of a software functional unit and sold or used as a stand-alone product, the functionality can be stored in a computer readable storage medium. Based on such understanding, technical solutions of the present disclosure in essence, or in part, or part of the technical solutions which contributes to the related art, can be embodied in the form of a software product. The software product can be stored in a storage medium and include several instructions, which can cause computer equipment (such as a personal computer, a server, or network equipment) to execute all or part of the method steps of the implementations of the present disclosure. The aforementioned storage medium includes U-disk, mobile hard disk, Read-Only Memory (ROM), Random Access Memory (RAM), disk, CD, or various media that can store program code.

While the present disclosure has been described in detail above with reference to the exemplary implementations, the scope of the present disclosure is not limited thereto. As will occur to those skilled in the art, the present disclosure is susceptible to various modifications and changes without departing from the spirit and principle of the present disclosure. Therefore, the scope of the present disclosure should be determined by the scope of the claims.

What is claimed is:

1. An apparatus for charging a mobile terminal, comprising:
   an input end, configured to receive an alternating current;
   a Universal Serial Bus (USB) interface, configured to connect the apparatus with the mobile terminal;
   a power supply circuit connected with the input end and the USB interface respectively, wherein the power supply circuit is configured to convert the alternating current inputted through the input end into a direct current and transmit an output power of the power supply circuit to the mobile terminal through the USB interface to charge a battery of the mobile terminal;
   a control chip connected with the USB interface and configured to exchange data with the mobile terminal through a data line of the USB interface;
   a current detection circuit connected with the power supply circuit and configured to detect a current output current of the power supply circuit;
   a voltage detection circuit connected with the power supply circuit and configured to detect a current output voltage of the power supply circuit;
   an analog to digital converter (ADC) connected with the current detection circuit, the voltage detection circuit, and the control chip, respectively, wherein the current detection circuit and the voltage detection circuit are configured to provide the control chip with a current value of the current output current and a voltage value of the current output voltage through the ADC, respectively, and wherein the ADC is further configured to be connected with a data line pin of the USB interface and is configured to acquire a voltage value of the data line pin and transmit the voltage value of the data line pin to the control chip;
   a power adjusting circuit connected with the control chip and the power supply circuit respectively and configured to adjust an output power of the power supply circuit under control of the control chip according to at least one of: the voltage value of the current output voltage of the power supply circuit, the current value of the current output current of the power supply circuit, and the voltage value of the data line pin; and
   a selecting circuit, wherein the selecting circuit comprises a first input end connected with the control chip, a second input end connected with the ADC directly without passing through the control chip, and an output end connected with the power adjusting circuit, and the selecting circuit is configured to select a current control signal from a first current control signal input through the first input end and a second current control signal input through the second input end, and the power adjusting circuit is configured to adjust an output current of the power supply circuit based on the current control signal selected.

2. The apparatus of claim 1, further comprising:
   a switching circuit connected in series in the power supply circuit and connected with the control chip, wherein the control chip is further configured to control ON/OFF of a charging circuit between the apparatus and the mobile terminal through the switching circuit.

3. The apparatus of claim 2, wherein the switching circuit comprises:
   a switch transistor assembly connected in series in the power supply circuit;
   a charge pump, wherein the charge pump comprises a first end connected with a control end of the switch transistor assembly and a second end connected with the control chip; and
   the control chip is further configured to generate a target control voltage through the charge pump and control the switch transistor assembly to turn on, wherein the target control voltage is greater than a working voltage of the apparatus.

4. The apparatus of claim 3, wherein the switch transistor assembly comprises a first switch transistor and a second switch transistor, wherein the first switch transistor and the second switch transistor are connected in series in the power supply circuit and disposed back to back.

5. The apparatus of claim 2, further comprising:
   a temperature detection circuit connected with the ADC and configured to transmit a temperature detected to the control chip through the ADC; and
   the control chip is further configured to control the ON/OFF of the switching circuit according to the temperature detected by the temperature detection circuit.

6. The apparatus of claim 5, wherein the temperature detection circuit comprises:
   a temperature sensor connected with the ADC; and
   a negative temperature coefficient resistor, wherein the negative temperature coefficient resistor comprises a third end connected with the temperature sensor and a fourth end grounded.

7. The apparatus of claim 2, wherein the voltage detection circuit comprises a first voltage detection circuit and a second voltage detection circuit, wherein the first voltage detection circuit and the second voltage detection circuit are provided at both ends of the switching circuit, respectively.

8. The apparatus of claim 1, further comprising:
   a load circuit connected with the power supply circuit and the control chip respectively; and
   wherein the control chip is further configured to control the load circuit to turn on when an output voltage of the power supply circuit is less than a preset voltage threshold, and supply power for load devices of the load circuit through the power supply circuit to maintain stability of the power supply circuit.

9. The apparatus of claim 8, wherein the load circuit comprises:

a third switch transistor, wherein the third switch transistor comprises a control end connected with the control chip, an input end connected with the power supply circuit, and an output end grounded; and a load resistor connected in series in the load circuit.

10. The apparatus of claim 1, wherein the control chip is configured to at least one of:

short connect a D+ data line and a D− data line of the USB interface through the data line of the USB interface;

exchange data with the data line of the USB interface via a General Purpose Input/Output (GPIO) port through the data line of the USB interface; and exchange data in the format of Universal Asynchronous Receiver Transmitter (UART) with the mobile terminal through the data line of the USB interface.

11. The apparatus of claim 1, wherein the control chip is further connected with an ID line of the USB interface, and the control chip is further configured to identify, through the ID line, whether a charging data line between the apparatus and the mobile terminal is a data line that support quick charging.

12. The apparatus of claim 1, wherein the power supply circuit comprises:

a transformer;

an input circuit arranged on a primary side of a coil of the transformer, wherein the input circuit comprises a controller configured to control the voltage of the input circuit;

an output circuit arranged on a secondary side of the coil of the transformer, wherein the power adjusting circuit comprises a potentiometer and a first operational amplifier, wherein the potentiometer is connected with the control chip and the output circuit respectively and connected with the controller of the input circuit through the first operational amplifier, and is configured to adjust an output voltage of the power supply circuit through the controller.

13. The apparatus of claim 1, wherein the current detection circuit comprises:

a second operational amplifier, wherein the second operational amplifier comprises two input ends connected in parallel at both ends of a current sense resistor of the power supply circuit and an output end connected with the ADC, and the second operational amplifier is configured to detect an output current of the power supply circuit through a voltage drop across both ends of the current sense resistor.

14. An apparatus for charging a mobile terminal, comprising:

an input end, configured to receive an alternating current;

a power supply circuit connected with the input end;

a control chip configured to exchange data with the mobile terminal and identify whether a charging data line between the apparatus and the mobile terminal supports quick charging;

a current detection circuit connected with the power supply circuit and configured to detect a output current of the power supply circuit;

a voltage detection circuit connected with the power supply circuit and configured to detect a output voltage of the power supply circuit;

an analog to digital converter (ADC) connected with the current detection circuit, the voltage detection circuit, and the control chip, respectively;

a power adjusting circuit connected with the control chip and the power supply circuit respectively and configured to adjust an output power of the power supply circuit under control of the control chip; and a selecting circuit, wherein the selecting circuit comprises a first input end connected with the control chip, a second input end connected with the ADC directly without passing through the control chip, and an output end connected with the power adjusting circuit, and the selecting circuit is configured to select a current control signal from a first current control signal input through the first input end and a second current control signal input through the second input end, and the power adjusting circuit is configured to adjust an output current of the power supply circuit based on the current control signal selected.

15. The apparatus of claim 14, further comprising:

a switch transistor assembly comprising a first switch transistor and a second switch transistor, wherein the first switch transistor and the second switch transistor are connected in series in the power supply circuit and disposed back to back;

a charge pump, wherein the charge pump comprises a first end connected with a control end of the switch transistor assembly and a second end connected with the control chip; and the control chip is further configured to generate a target control voltage through the charge pump and control the switch transistor assembly to turn on, wherein the target control voltage is greater than a working voltage of the apparatus.

16. The apparatus of claim 14, wherein at least one of:

the current detection circuit and the voltage detection circuit are configured to provide the control chip with a current value of a current output current and a voltage value of a current output voltage through the ADC, respectively; and the power supply circuit is configured to convert the alternating current inputted through the input end into a direct current and transmit an output power of the power supply circuit to the mobile terminal to charge a battery of the mobile terminal.

* * * * *